Oct. 11, 1949.　　　　　C. L. RACE　　　　　2,484,586
FREQUENCY MODULATION MONITORING
Filed Sept. 28, 1946
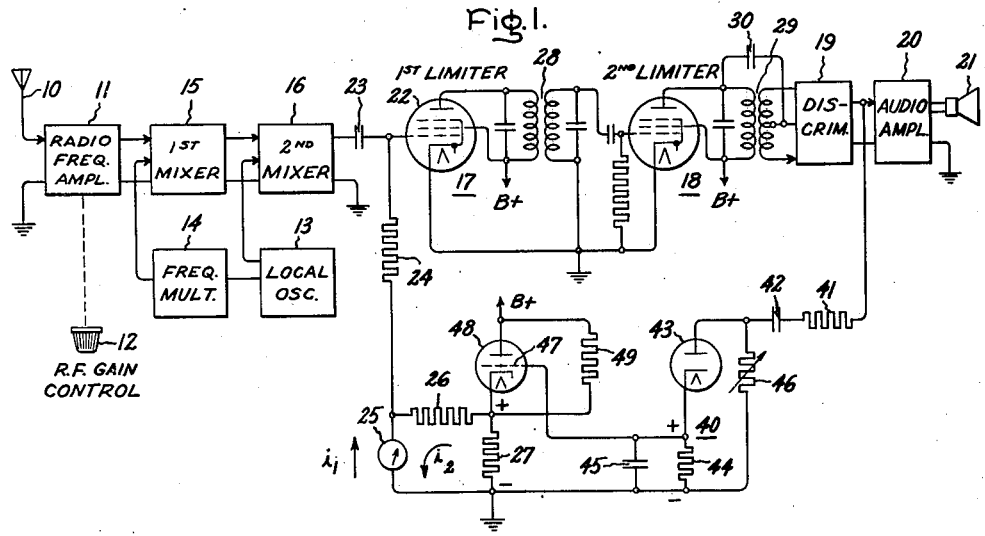
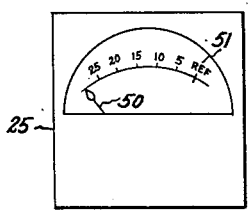
CARRIER OFF
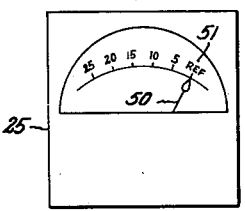
CARRIER ON
BUT WITHOUT
MODULATION
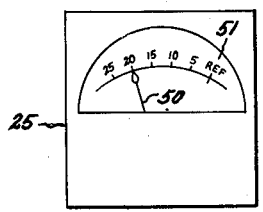
CARRIER ON
WITH NORMAL
MODULATION
Inventor:
Charles L. Race,
by Merton D Moore
His Attorney.

Patented Oct. 11, 1949

2,484,586

UNITED STATES PATENT OFFICE 2,484,586

FREQUENCY-MODULATION MONITORING

Charles L. Race, Syracuse, N. Y., assignor to General Electric Company, a corporation of New York Application September 28, 1946, Serial No. 700,153

9 Claims. (Cl. 332—20)

1

My invention relates to frequency modulation monitoring and particularly to an improved method and apparatus for monitoring a carrier wave and also the degree of frequency modulation of the wave.

These measurements are required in the operation of a frequency modulation transmitter, especially when the transmitter is remotely controlled. The operating engineer must be able to monitor both the carrier and the frequency deviation resulting from modulation quickly and accurately at the control point in order to comply with frequency modulation broadcasting standards.

It is accordingly an object of my invention to provide an improved method and apparatus for quickly and accurately determining the presence of a carrier wave and the degree of modulation thereof.

It is also an object of my invention to provide an improved frequency modulation monitor which may utilize a single indicating device for making both of these determinations.

It is a further object of my invention to provide an improved frequency modulation monitor in which a single indicating instrument is employed which can be calibrated for both the carrier and its degree of modulation in such manner that the accuracy of indication of both these factors is increased.

The features of my invention which I believe to be novel are set forth with particularity in the appended claims. My invention itself, however, together with further objects and advantages thereof, may best be understood by reference to the following description taken in connection with the accompanying drawing in which Fig. 1 is a diagrammatic representation of a frequency modulation receiver, partly in simplifed schematic form, incorporating the frequency modulation monitoring method and apparatus of my invention; and Figs. 2, 3, and 4 are representations of a measuring instrument suitable for use in the circuit of Fig. 1, the indicating scale of which is calibrated in accordance with the principles of my invention.

The radio receiver in Fig. 1 is adapted to receive frequency-modulated carrier signals impressed on antenna 10 from the remote transmitter. Of course, the signals may alternatively be supplied over wire lines. The initial stages of the receiver, which is illustrated as of the double conversion superheterodyne type, are represented conventionally in block form, since their details form no part of my invention. As shown, they may comprise a radio frequency amplifier 11 with a manual radio frequency gain control 12. The amplified high frequency signals are then converted to a suitable intermediate frequency through two successive conversions. As shown, oscillations from local oscillator 13 are multiplied to a suitable frequency for the first conversion by a frequency multiplier 14 and supplied with the radio frequency signals to the first mixer 15. The local oscillations are also supplied directly to the second mixer 16 to effect the second conversion.

The remaining stages of the receiver per se may also be conventional. Amplitude modulation is removed from the intermediate frequency signals by the first and second limiters 17 and 18 and the frequency modulation thereof is converted to audio signals in any suitable form of frequency discriminator 19. The audio signals may be further amplified in audio amplifier 20 and supplied to the loud-speaker 21.

The first limiter 17 comprises a pentode amplifier having the intermediate frequency signals impressed upon its control grid through the coupling network comprising capacitor 23 and grid leak resistor 24. Resistor 24 is returned to the grounded cathode through a suitable indicating instrument 25, for reasons which will shortly appear. The instrument 25 may for example be a direct current milliammeter and is also shunted by the series resistors 26 and 27.

Suitable anode and screen grid operating potentials for amplifier 22 are supplied from any suitable source indicated only conventionally by B+. As is well understood in the art, the amplifier 22 is selected to have a sharp cut-off characteristic and limiting action is effected by (1) the self-bias developed through rectified grid current due to the action of the capacitor 23 and the grid leak resistor 24 and also by (2) the application of proper B+ voltages to the screen and anode. The limited signals appear in the anode circuit of the amplifier 22. These signals are coupled to the second limiter 18 through the usual tuned intermediate frequency transformer 28.

The construction and operation of the second limiter 18 may be substantially identical to that of the first limiter 17 and it operates effectively to remove any remaining amplitude modulation present in the wave. The doubly-limited signals are then supplied to discriminator 19 through the network comprising tuned transformer 29 and coupling capacitor 30.

It will be readily understood by those skilled in the art that the amplitude of the audio signals appearing at the output of the discriminator 19 during modulation of the incoming carrier is substantially proportional to the degree of modulation, i. e., to the deviation from mean carrier frequency caused by modulation. A portion of these audio signals is supplied to a peak detector circuit 40 through a decoupling resistor 41 and coupling capacitor 42. The detector circuit 40 may comprise any suitable rectifier, shown as a diode 43, in circuit with a load resistor 44 shunted by an audio frequency bypass capacitor 45. The amount of current flowing through the diode 43 and load resistor 44 may also be controlled, for purposes of calibration, by the variable resistor 46 shunted across them.

Rectified audio potentials appearing across load resistor 44 are supplied directly to the control grid 47 of a triode 48. Anode potential is supplied from any suitable source, again indicated conventionally by B+, and the triode 48 is normally maintained biased to a value near cut-off by current flowing through a voltage divider network comprising the anode load resistor 49 and the resistor 27 which is common to the grid and anode circuits.

The adjustment and operation of the circuits just described will now be considered, with reference to the meter indications shown in Figs. 2, 3, and 4. In the absence of any received carrier, the ammeter needle 50 is assumed to be in the position shown in Fig. 2. The transmitter is first put into operation without modulation on the carrier wave. As is well understood in the art, rectified grid current is drawn by the limiter 17, the magnitude being dependent upon the strength of the signal supplied thereto, i. e., to the average amplitude of the envelope of the wave. The direction of flow of this current is upward through the indicating instrument 25, as represented by the arrow $i_1$, next to meter 25 in Fig. 1, and the direction of deflection is assumed to be to the right as shown in Fig. 3. The gain of the receiver preceding the limiter 17 is now adjusted, by operation of the radio frequency gain control 12, to give some arbitrary scale reading on the meter 25, for example at approximately 75 to 95% of full scale deflection. Such a reading is indicated in Fig. 3 with the needle 50 adjusted to point to the "Reference" point 51. Any subsequent decrease or increase in the reading will immediately indicate corresponding output changes of the transmitter being monitored. If frequency modulation is now impressed upon the carrier in response to audio signals, corresponding audio signals will appear at the output of discriminator 19, as previously described, and the amplitude of these signals will be substantially proportional to the frequency deviation or per cent modulation of the carrier. Detection of these signals in the peak detector 40 causes unidirectional potentials to appear across resistor 44 in the polarity indicated in Fig. 1. The time constant of resistor 44 and capacitor 45 is selected to be relatively long as compared to the periods of frequency components present in the audio signal.

It will be observed that the rectified audio tends to drive the grid 47 positive, causing flow of anode current to increase through triode 48 and resistor 27. The voltage developed across resistor 27 is also applied across resistor 26 and the meter 25, causing a portion of the current to flow through meter 25, as indicated by the arrow $i_2$. It will be observed that since the upper end of resistor 27 becomes more positive in response to the detected audio signals, this current flow $i_2$ through meter 25 opposes the current flow $i_1$ through the meter due to the rectified carrier. Therefore, the pointer 50 drops back toward the left, as indicated in Fig. 4, by an amount proportional to the degree of modulation of the signal.

The variable resistor 46 allows calibration of the meter for the modulation indication. This will generally be initially set at the factory and need not normally be readjusted. The scale of the instrument 25 may be calibrated in any suitable manner, for example in actual kilocycles of frequency deviation as illustrated in Figs. 2, 3 and 4, or in terms of the per cent modulation.

The "kick-down" action of the indicating instrument 25 in the presence of modulation has several advantages. In the first place, with no modulation on the carrier and the receiver gain adjusted to the "reference" level, the meter has a substantial deflection. With most meters of the type suitables for this work, this is in a region of maximum meter sensitivity, and any decrease or increase in the transmitter carrier power will result in a larger displacement of the needle than would be noticed at lower reading. Secondly, substantially all of the meter scale is available for calibration in terms of modulation in the opposite direction from the "Reference" point. This effectively spreads the scale over a much greater range than if the carrier and the modulation both produced movement of the needle in the same direction, giving increased accuracy for modulation measurement as well as carrier strength.

If the modulation is sufficiently steady to cause the needle 15 to remain substantially stationary, as when a continuous audio test signal is used for monitoring, the presence of modulation is readily determined aurally from the loud-speaker 21. However, normally modulation due to speech or music will result in a distinctive erratic "kick" of the meter needle 50, providing the time constant of the detector 40 is properly adjusted.

While I have shown a particular embodiment of my invention, it will of course be understood that I do not wish to be limited thereto since various modifications may be made. For example, it may be desirable in some cases to pass the grid currents from both the first limiter 17 and the second limiter 18 through the indicating instrument 25. Also, while I have shown the indicating instrument 25 in the form of a direct current milliammeter, any other suitable equivalent indicating device, such as a cathode ray tube or a suitable recorder might alternatively be utilized. These and other modifications will readily occur to those skilled in the art and I contemplate by the appended claims to cover any such modifications that fall within the true spirit and scope of my invention.

What I claim as new and desire to secure by Letters Patent of the United States, is:

1. The method of monitoring a frequency modulation carrier signal which comprises the steps of developing a first unidirectional potential dependent upon the average amplitude of said signal, developing a second unidirectional potential proportional to the degree of frequency modulation of said signal, measuring the difference between said potentials and indicating said difference.

2. The method of monitoring a frequency modulated oscillatory wave which comprises the steps of producing an indication which is a function of the average amplitude of said wave and reducing said indication in accordance with a function of the degree of frequency modulation of said wave.

3. The method of analyzing a carrier wave which may be frequency modulated, comprising the steps of amplifying said wave, producing an indication which is a function of the average amplitude of the envelope of said amplified wave, adjusting the amplification of said wave to adjust said indication to a predetermined reference level, and reducing said indication from said predetermined level in acordance with a function of frequency modulation present in said wave.

4. Apparatus for analyzing frequency modulated waves comprising, in combination, means responsive to the average amplitude of said waves for producing an indication, and means responsive to the degree of frequency modulation of said waves and cooperating with said first means to reduce said indication.

5. A frequency modulation monitor comprising, in combination, means responsive to an applied high-frequency carrier wave for developing a first unidirectional potential dependent upon its average amplitude, means responsive to said wave for developing a second unidirectional potential dependent upon deviations in frequency of said wave from a predetermined frequency, and means for measuring and indicating the difference between the amplitudes of said potentials.

6. A frequency modulation monitor comprising, in combination, means responsive to an applied high-frequency carrier wave for developing a first unidirectional potential dependent upon its average amplitude, means responsive to said wave for developing a second unidirectional potential dependent upon deviations in frequency of said wave from a predetermined frequency, means for combining said potentials in opposing polarity, and indicating means responsive to their difference.

7. Apparatus for determining the presence of an oscillatory carrier wave and the degree of frequency modulation thereof comprising, in combination, means for developing a first current substantially proportional to the average amplitture of the envelope of said wave, means for developing a second current substantially proportional to the degree of frequency modulaticn of said wave, means for indicating the magnitude of said first current and means for reducing said indication in accordance with the magnitude of said second current.

8. In apparatus for analyzing a carrier wave which may be frequency modulated, the combination of means for amplifying said wave, means for producing a first unidirectional potential substantially proportional to. the average amplitude of the envelope of said amplified wave, means for producing a second unidirectional potential substantially proportional to the degree of any frequency modulation present in said wave, an indicating device adapted to measure said potentials, means for applying said first potential to said device, means for adjusting the amplification of said first means to produce a predetermined indication of said device in response to said first potential, and means for applying said second potential to said device in opposing sense so as to reduce the indication from said predetermined indication, said device being calibraed in accordance with a function of frequency modulation as measured from said predetermined indication.

9. In apparatus for analyzing a frequency modulated carrier wave, the combination of a limiter amplifier for said wave having a grid circuit and an output circuit, said grid circuit developing unidirectional current substantially proportional to carrier strength by grid rectification, a frequency discriminator supplied from said output circuit for developing modulation signals substantially proportional to the degree of frequency modulation of said wave, a peak rectifier for developing second unidirectional currents in response to said signals, a unidirectional current indicating device interconnected with said grid circuit and said rectifier so that said currents tend to produce indications in opposite senses, and means for adjusting the intensity of said first currents to produce a predetermined indication in one sense in the absence of modulation of said wave, said device being calibrated in the opposite sense from said predetermined indication in terms of the degree of frequency modulation of said wave.

CHARLES L. RACE.

REFERENCES CITED

The following references are of record in the file of this patent:

UNITED STATES PATENTS

| Number | Name | Date |
|--------|------|------|
| 1,915,558 | Terman | June 27, 1933 |
| 2,362,830 | Kline | Nov. 14, 1944 |
| 2,415,456 | Brumbaugh | Feb. 1, 1947 |

Certificate of Correction

Patent No. 2,484,586

October 11, 1949

CHARLES L. RACE

It is hereby certified that errors appear in the printed specification of the above numbered patent requiring correction as follows:

Column 4, line 20, for "suitables" read *suitable*; column 5, lines 44 and 45, for "ampliture" read *amplitude*; column 6, lines 16 and 17, for "calibraed" read *calibrated*; and that the said Letters Patent should be read with these corrections therein that the same may conform to the record of the case in the Patent Office.

Signed and sealed this 7th day of March, A. D. 1950.

[SEAL]

THOMAS F. MURPHY,
*Assistant Commissioner of Patents.*